(12) United States Patent
Fujiu et al.

(10) Patent No.: US 7,153,228 B2
(45) Date of Patent: Dec. 26, 2006

(54) POWER TRANSMISSION

(75) Inventors: Hideaki Fujiu, Isesaki (JP); Hideyuki Gonda, Isesaki (JP)

(73) Assignee: Sanden Corporation, Isesaki (JP)

( * ) Notice: Subject to any disclaimer, the term of this patent is extended or adjusted under 35 U.S.C. 154(b) by 299 days.

(21) Appl. No.: 10/736,642

(22) Filed: Dec. 17, 2003

(65) Prior Publication Data
US 2004/0124058 A1 Jul. 1, 2004

(30) Foreign Application Priority Data
Dec. 25, 2002 (JP) .............................. 2002-375381

(51) Int. Cl.
*F16H 63/00* (2006.01)
(52) U.S. Cl. ....................................................... 474/70
(58) Field of Classification Search ................ 474/70, 474/74, 199; 310/75 R, 76, 78, 92
See application file for complete search history.

(56) References Cited

U.S. PATENT DOCUMENTS

| | | | |
|---|---|---|---|
| 4,650,052 A * | 3/1987 | Okada | ........................ 192/84.1 |
| 5,516,331 A | 5/1996 | Morr et al. | |
| 5,564,981 A | 10/1996 | Iwabuchi et al. | |
| 5,704,839 A | 1/1998 | Michael et al. | |
| 5,944,156 A | 8/1999 | Hatakeyama | |
| 6,169,347 B1 | 1/2001 | Sakamoto et al. | |
| 6,273,230 B1 * | 8/2001 | Nakano et al. | ........ 192/84.961 |
| D460,093 S | 7/2002 | Ochiai | |
| D460,770 S | 7/2002 | Ochiai | |
| 6,425,837 B1 | 7/2002 | Ochiai | |
| 6,494,799 B1 | 12/2002 | Ochiai | |
| 6,617,727 B1 * | 9/2003 | Iwasa et al. | .............. 310/75 R |
| 6,893,368 B1 * | 5/2005 | Fujiwara et al. | .............. 474/70 |
| 2003/0104890 A1 | 6/2003 | Ochiai | |

\* cited by examiner

*Primary Examiner*—Vicky A. Johnson
(74) *Attorney, Agent, or Firm*—Baker Botts L.L.P.

(57) ABSTRACT

A power transmission includes a first rotating member driven by an external drive source, an electromagnetic solenoid provided to the first rotating member, a second rotating member fixed to a main shaft of a rotary apparatus, and an mechanism for engaging and disengaging a plunger of the electromagnetic solenoid from the second rotating member. When the rotary apparatus is not used, the energy of the external drive source may be prevented from being wasted by interrupting the torque transmission from the first rotating member to the second rotating member by the operation of the mechanism for engaging and disengaging.

17 Claims, 3 Drawing Sheets

POWER TRANSMISSION

BACKGROUND OF THE INVENTION

1. Field of the Invention

The present invention relates to a power transmission, and more particularly, to a power transmission suitable for a drive mechanism of a compressor used in an air conditioning system for vehicles.

2. Description of Related Art

In a known external signal controlled-type compressor used in an air conditioning system for vehicles such as the compressor shown in Japanese Patent Application No. JP-A-6-34684, the compressor's displacement is controlled by an external signal, and the compressor is connected directly to and driven by an engine. In the known external signal controlled-type compressor, when the air conditioning system is not in operation, the engine drive the compressor at a minimum displacement. Nevertheless, because the compressor is in operation and the engine drives a rotating member of the compressor when the a/c system is not in operation, the energy of the driving engine of the vehicle is wasted.

SUMMARY OF THE INVENTION

Accordingly, it is an object of the present invention to provide a power transmission which may be used in an external signal controlled-type compressor, which engages and disengages torque transmission by an uncomplicated mechanism.

To achieve the foregoing or other objects, or both, a power transmission according to an embodiment of the present invention comprises a first rotating member driven by an external drive source (e.g., an engine of a vehicle) The power transmission also may comprise an electromagnetic solenoid provided on the first rotating member, a second rotating member connected to a main shaft of a rotary apparatus (e.g., a compressor, such as, an external signal controlled-type compressor), and a mechanism for engaging a plunger of the electromagnetic solenoid to the second rotating member and for disengaging the plunger from the second rotating member.

In the power transmission, the torque transmission between the first and second rotating members may be switched with certainty between ON and OFF conditions by engaging the plunger of the electromagnetic solenoid to the second rotating member and disengaging the plunger from the second rotating member, respectively, by controlling the operation of the electromagnetic solenoid.

In another embodiment, the mechanism for engaging and disengaging may comprise internal teeth formed on the plunger of the electromagnetic solenoid and external teeth formed on the second rotating member. In yet another embodiment, the mechanism for engaging and disengaging may comprise external teeth formed on the plunger of the electromagnetic solenoid and internal teeth formed on the second rotating member. In still another embodiment, the mechanism for engaging and disengaging may comprise teeth formed on an end of the plunger of the electromagnetic solenoid and on an end of the second rotating member opposing the end of the plunger, and during switching, the teeth of each end are engaged or disengaged from each other. The mechanism for engaging and disengaging may comprise any of these configurations. Further, the second rotating member may comprise a hub for fixedly connecting the second rotating member to the main shaft and a damper positioned between the hub and the second teeth.

In yet another embodiment, a power transmission may comprise a first rotating member driven by an external drive source, an electromagnetic solenoid provided on the first rotating member, a second rotating member connected to a main shaft of a rotary apparatus; and a mechanism for engaging a plunger of the electromagnetic solenoid to and for disengaging the plunger from the second rotating member. The mechanism may comprise a motivator manufactured from a magnetic material, such that when the electromagnetic solenoid is activated, said plunger engages the second rotating member, and a biasing means, such that when the electromagnetic solenoid is deactivated, the biasing means disengages the plunger from the second rotating member.

Further, the power transmission may comprise a guide mechanism for guiding the plunger of the electromagnetic solenoid along the first rotating member. The guide mechanism may be positioned between the plunger and the first rotating member. The guide mechanism may make, the movement of the plunger more stable. The guide mechanism also may make the engagement and disengagement between the plunger and the second rotating member more smooth.

Moreover, the power transmission may comprise a torque limiter provided to the second rotating member. When the rotary equipment is secured, the torque limiter may reduce or eliminate the likelihood that a belt, band, cable, chain, or the like wound between the external drive source and the first rotating member will brake.

Thus, in the power transmission according to the present invention, with an uncomplicated structure, the torque transmission between the first and second rotating members may be switched with certainty between ON and OFF conditions by engaging and disengaging, respectively, the plunger of the electromagnetic solenoid from the second rotating member by controlling the operation of the electromagnetic solenoid. Consequently, when it is not necessary to drive the rotary equipment, the rotation of the second rotating member connected to the main shaft of the rotary equipment may be stopped completely, thereby saving energy of the external drive source and without consuming the energy wastefully. Therefore, the power transmission according to the present invention is particularly suitable for applications in which the drive mechanism of a compressor connected directly to an engine used in an air conditioning system for vehicles.

Further objects, features, and advantages of the present invention will be understood from the following detailed description of preferred embodiments of the present invention with reference to the accompanying figures.

BRIEF DESCRIPTION OF THE DRAWINGS

Embodiments of the invention now are described with reference to the accompanying figures, which are given by way of example only, and are not intended to limit the present invention.

DETAILED DESCRIPTION OF PREFERRED EMBODIMENTS

Figure 1:
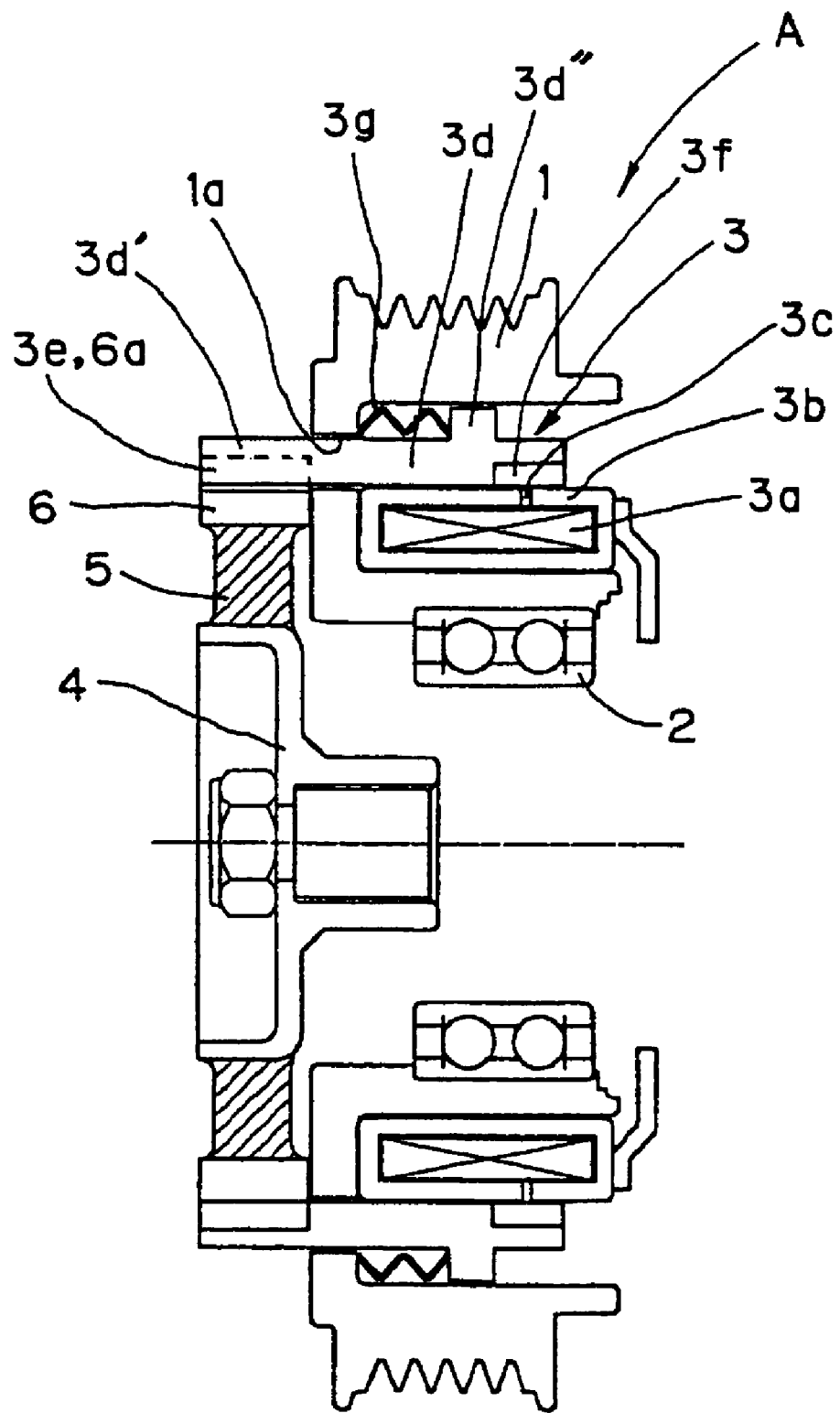
FIG. 1 is a vertical, cross-sectional view of a power transmission according to an embodiment of the present invention.
Figure 2:
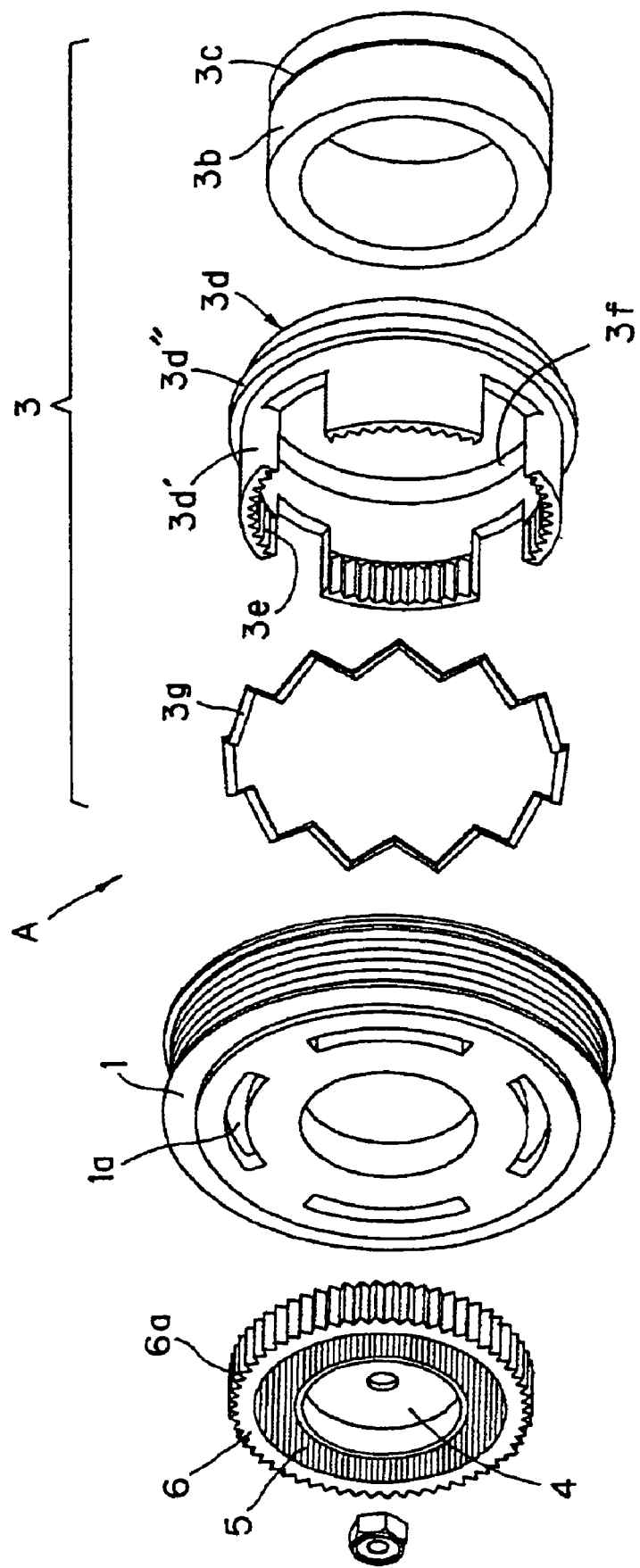
FIG. 2 is an exploded perspective view of the power transmission depicted in FIG. 1.

FIGS. 1 and 2 depict a power transmission according to an embodiment of the present invention applied to an external signal controlled-type compressor used in an air conditioning system for vehicles. As depicted in FIGS. 1 and 2, a power transmission A comprises an annular pulley 1 as a first rotating member, e.g., an annular pulley 1, which a U-shaped cross section. Pulley 1 may be connected to an engine (not shown) of a vehicle, and the engine may be used as an external drive source via a belt, band, cable, chain, or the like (not shown). Pulley 1 may be supported by a casing (not shown) of an external signal control-type compressor via a bearing 2.

An electromagnetic solenoid 3 may be provided within pulley 1. Electromagnetic solenoid 3 may have a coil 3a and an annular yoke 3b having a rectangular, hollow, cross-section which contains the coil 3a. Yoke 3b may be fixed to the casing of the external signal controlled-type compressor. A slit 3c may be formed in the outer surface of yoke 3b over the entire circumference of yoke 3b. An annular plunger 3d may be mounted onto the outer surface of yoke 3b movably in the axial direction and rotatably relative to the yoke 3b. A plurality of projected portions 3d' may extend from a first end of plunger 3d. Each portion 3d' may have an arc shape and may be formed to be received through slits 1a, which slits 1a are formed through an end plate of pulley 1. Internal teeth 3e may be formed on the inner surface of respective projected portions 3d'. An annular collar portion 3d" may be formed on the outer surface of plunger 3d at a position distal to portions 3d'. An outer surface of collar portion 3d" may be engaged slidably with the inner surface of pulley 1. An annular ring 3f of a magnetic material, such as iron or a ferromagnetic alloy, may be fixed on the inner surface of a second end of plunger 3d. A spring 3g may be positioned between collar portion 3d" and the end plate of pulley 1.

Power transmission (A) also may comprise a second rotating member e.g., an annular hub 4. Hub 4 may be fixed to a main shaft (not shown) of the external signal control-type compressor. An annular damper 5 may be fitted and fixed onto a radially outer surface of hub 4. Damper 5 may be formed of a shock and vibration absorbent material, such as rubber or another suitable polymeric material. An annular connecting member 6 may be fitted and fixed onto the outer surface of damper 5. External teeth 6a may be formed on the outer surface of connecting member 6, and the external teeth 6a may engage internal teeth 3e formed in plunger 3d of electromagnetic solenoid 3.

Power transmission (A) also may comprise a torque limiter. Torque limiters are known in the art. In one embodiment, hub 4, damper 5, and connecting member 6 may be configured to act together to perform the function of a torque limiter. For example, it is known in the art to have damper 5 configured to disconnect from hub 4 or from connecting member 6 when the torque exceeds a predetermined level. Other methods of incorporating a torque limiter into a driving mechanism also are known in the art, and will be apparent to those of ordinary skill in the art upon a consideration of the present specification.

In power transmission (A), when the air conditioning system is in operation, electric power may be applied to coil 3a of electromagnetic solenoid 3, annular ring 3f may move in the axial direction by the generated magnetic force, plunger 3d may compress spring 3g, projected portions 3d' may penetrate pulley 1 through slits 1a, and internal teeth 3e may engage external teeth 6a. The engagement between internal teeth 3e and external teeth 6a may occur when the vehicle engine is stopped or rotated at a low speed.

The engine may transmit a torque to pulley 1 via a belt (e.g., an endless belt), band, cable, chain, or the like. The torque is transmitted to connecting member 6 via the engagement between internal teeth 3e and external teeth 6a, transmitted to hub 4 through damper 5, and then transmitted to the main shaft of the external signal controlled-type compressor. Thus, when the external signal controlled-type compressor is in operation, refrigerant is compressed, and the compressed refrigerant is sent to a refrigerant circuit of the air conditioning system.

When the air conditioning system is not in use, for example, in cold weather, electric power is not transmitted to coil 3a of electromagnetic solenoid 3. Consequently, no magnetic force is generated by coil 3a, plunger 3d is pushed back by spring 3g, projected portions 3d' are retreated through slits 1a, and internal teeth 3e and external teeth 6a is disengage. The disengagement of internal teeth 3e from external teeth 6a may occur at an arbitrary timing. When internal teeth 3e end external teeth 6a disengage, the transmission of torque from pulley 1 to hub 4 is interrupted. Consequently, the transmission of torque from the vehicle engine to the external signal controlled-type compressor also is interrupted, and the waste of energy of the vehicle engine in operating the compressor may be reduced or eliminated.

Further, collar portion 3d" of plunger 3d and the inner surface of pulley 1 may form a guide mechanism positioned between plunger 3d and pulley 1. Because collar portion 3d" of plunger 3d slidably engages with the inner surface of pulley 1, and collar portion 3d" is guided along the inner surface of the pulley 1, the movement of the plunger 3d may be made more stable, and the engagement and disengagement between internal teeth 3e and external teeth 6a may be made more smooth.

Figure 3:
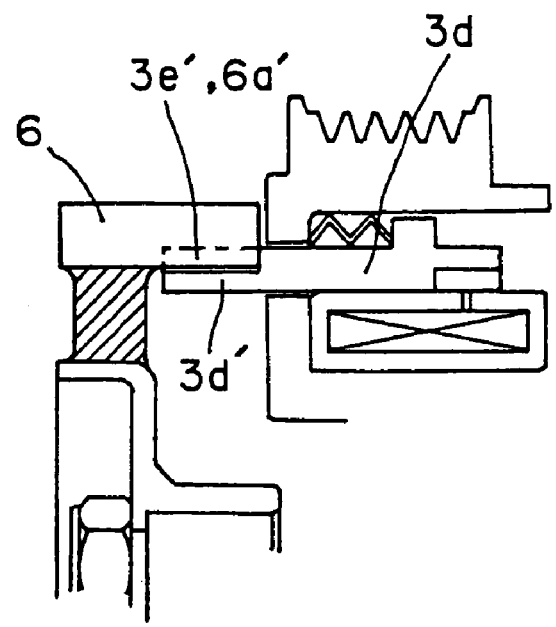
FIG. 3 is a partial, vertical, cross-sectional view of a power transmission according to another embodiment of the present invention.

As depicted FIG. 3, the mechanism for engaging and disengaging plunger 3d from hub 4 may be constructed, such that external teeth 3e' are formed on an outer surface of projected portions 3d' of plunger 3d, and internal teeth 6a' are adapted to engage external teeth 3e'.

Figure 4:
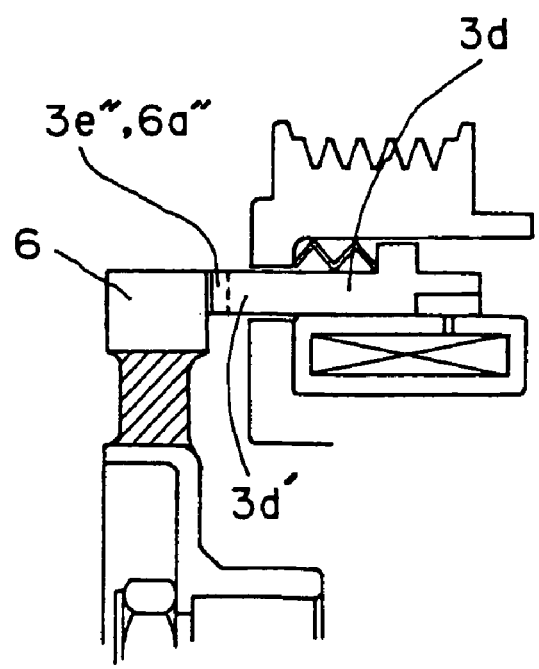
FIG. 4 is a partial, vertical, cross-sectional view of a power transmission according to a further embodiment of the present invention.

Further, as depicted in FIG. 4, the mechanism for engaging and disengaging plunger 3d from hub 4 may be constructed such that teeth 3e" are formed on an end of projected portions 3d' of plunger 3d, and teeth 6a" are adapted to engage teeth 3e".

Further, a torque limiter may be provided at a position radially inside of plunger 3d, for example, at a position of damper 5. Many known mechanisms may be employed as the mechanism for the torque limiter (for example, torque limiters disclosed in U.S. Pat. No. 6,425,837 B1 and U.S. Pat. No. 6,494,799 B1 and U.S. Patent Application Publication No. US2003/0104890 A1, which are incorporated herein by reference). When the external signal controlled-type compressor is secured, the torque limiter operates, the transmission of torque from pulley 1 to hub 4 is interrupted, and the likelihood that the belt or other connection means wound between the vehicle engine and pulley 1 may brake or be damaged is reduced or eliminated.

While the present invention has been described in connection with preferred embodiments, it will be understood by those skilled in the art that various modifications of the preferred embodiments described above may be made without departing from the scope of the invention. Other embodiments will be apparent to those skilled in the art from a consideration of the specification or from a practice of the invention described herein. It is intended that the specification and the described examples are considered exemplary only, with the true scope of the invention indicated by the following claims.

What is claimed is:

1. A power transmission comprising:
   a first rotating member driven by an external drive source;
   an electromagnetic solenoid provided on said first rotating member;
   a second rotating member connected to a main shaft of a rotary apparatus; and
   a mechanism for engaging a plunger of the electromagnetic solenoid to said second rotating member and for disengaging said plunger from said second rotating member during an operation of said power transmission.

2. The power transmission according to claim 1, wherein said mechanism comprises internal teeth formed on said plunger of said electromagnetic solenoid and external teeth formed on said second rotating member wherein said internal teeth are adapted to engage said external teeth.

3. The power transmission according to claim 1, wherein said mechanism comprises external teeth formed on said plunger of said electromagnetic solenoid and internal teeth formed on said second rotating member wherein said external teeth are adapted to engage said internal teeth.

4. The power transmission according to claim 1, wherein said mechanism comprises first teeth formed on an end of said plunger of said electromagnetic solenoid and second teeth formed on an end of said second rotating member opposing said end of said plunger; wherein said first teeth are adapted to engage said second teeth.

5. The power transmission according to claim 1, further comprising a guide mechanism, wherein said guide mechanism for guiding said plunger of said electromagnetic solenoid along said first rotating member is provided between said plunger and said first rotating member.

6. The power transmission according to claim 1, further comprising a torque limiter, wherein said torque limiter is provided on said second rotating member.

7. The power transmission according to claim 1, wherein said rotary apparatus is a compressor for use in an air conditioning system for vehicles.

8. A power transmission comprising:
   a first rotating member driven by an external drive source;
   an electromagnetic solenoid provided on said first rotating member;
   a second rotating member connected to a main shaft of a rotary apparatus; and
   a mechanism for engaging a plunger of the electromagnetic solenoid to said second rotating member and for disengaging said plunger from said second rotating member during an operation of said power transmission;
   wherein said mechanism comprises a motivator manufactured from a magnetic material, such that when said electromagnetic solenoid is activated, said plunger engages said second rotating member, and a biasing means, such that when said electromagnetic solenoid is deactivated, said biasing means disengages said plunger from said second rotating member.

9. The power transmission according to claim 8, wherein said mechanism further comprises internal teeth formed on said plunger of said electromagnetic solenoid and external teeth formed on said second rotating member wherein said internal teeth are adapted to engage said external teeth.

10. The power transmission of claim 9, wherein said second rotating member further comprises a hub for fixedly connecting said second rotating member to said main shaft and a damper positioned between said hub and said external teeth.

11. The power transmission according to claim 8, wherein said mechanism further comprises external teeth formed on said plunger of said electromagnetic solenoid and internal teeth formed on said second rotating member wherein said external teeth are adapted to engage said internal teeth.

12. The power transmission of claim 11, wherein said second rotating member further comprises a hub for fixedly connecting said second rotating member to said main shaft and a damper positioned between said hub and said internal teeth.

13. The power transmission according to claim 8, wherein said mechanism further comprises first teeth formed on an end of said plunger of said electromagnetic solenoid and second teeth formed on an end of said second rotating member opposing said end of said plunger; wherein said first teeth are adapted to engage said second teeth.

14. The power transmission of claim 13, wherein said second rotating member further comprises a hub for fixedly connecting said second rotating member to said main shaft and a damper positioned between said hub and said second teeth.

15. The power transmission according to claim 8, further comprising a guide mechanism, wherein said guide mechanism for guiding said plunger of said electromagnetic solenoid along said first rotating member is provided between said plunger and said first rotating member.

16. The power transmission according to claim 8, further comprising a torque limiter, wherein said torque limiter is provided on said second rotating member.

17. The power transmission according to claim 8, wherein said rotary apparatus is a compressor for use in an air conditioning system for vehicles.

* * * * *